US008770384B2

(12) United States Patent
Takazawa

(10) Patent No.: US 8,770,384 B2
(45) Date of Patent: Jul. 8, 2014

(54) TRANSPORTATION UNIT AND IMAGE FORMING APPARATUS

(75) Inventor: Takayuki Takazawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 489 days.

(21) Appl. No.: 13/049,949

(22) Filed: Mar. 17, 2011

(65) Prior Publication Data

US 2011/0226588 A1 Sep. 22, 2011

(30) Foreign Application Priority Data

Mar. 17, 2010 (JP) ................................ 2010-061290

(51) Int. Cl.
*B65G 45/10* (2006.01)
*G03G 15/16* (2006.01)
*G03G 15/00* (2006.01)

(52) U.S. Cl.
USPC ........................................................ 198/494

(58) Field of Classification Search
None
See application file for complete search history.

(56) References Cited

U.S. PATENT DOCUMENTS 6,118,955 A * 9/2000 Yoneda et al. .................. 399/69
6,846,604 B2 * 1/2005 Emoto et al. ............... 430/110.3
7,392,003 B2 * 6/2008 Ito ................................ 399/302

FOREIGN PATENT DOCUMENTS

JP 2001-166603 A 6/2001
JP 2007-225969 9/2007
JP 2009-192901 A 8/2009
JP 2009192901 A * 8/2009

* cited by examiner

*Primary Examiner* — Kavel Singh
(74) *Attorney, Agent, or Firm* — Kubotera & Associates, LLC

(57) ABSTRACT

A transportation unit includes a transportation member and a cleaning member for cleaning foreign matters attached to a surface of the transportation member. The transportation member has the surface with a contact angle θ relative to n-dodecane between 10° and 45° (10°≤θ≤45°) and a mirror index M between 60 and 200 (60≤M≤200).

9 Claims, 4 Drawing Sheets

TRANSPORTATION UNIT AND IMAGE FORMING APPARATUS

BACKGROUND OF THE INVENTION AND RELATED ART STATEMENT

The present invention relates to a transportation unit and an image forming apparatus having the transportation unit.

In a conventional image forming apparatus, a cleaning member is provided for cleaning a foreign matter attached to a transportation member.

SUMMARY OF THE INVENTION

According to an aspect of the present invention, a transportation unit includes a transportation member and a cleaning member for cleaning foreign matters attached to a surface of the transportation member. The transportation member has the surface with a contact angle θ relative to n-dodecane between 10° and 45° ($10° \leq \theta \leq 45°$) and a mirror index M between 60 and 200 ($60 \leq M \leq 200$).

DETAILED DESCRIPTION OF PREFERRED EMBODIMENTS

Hereunder, embodiments of the present invention will be explained with reference to the accompanying drawings.

First Embodiment

Figure 1:
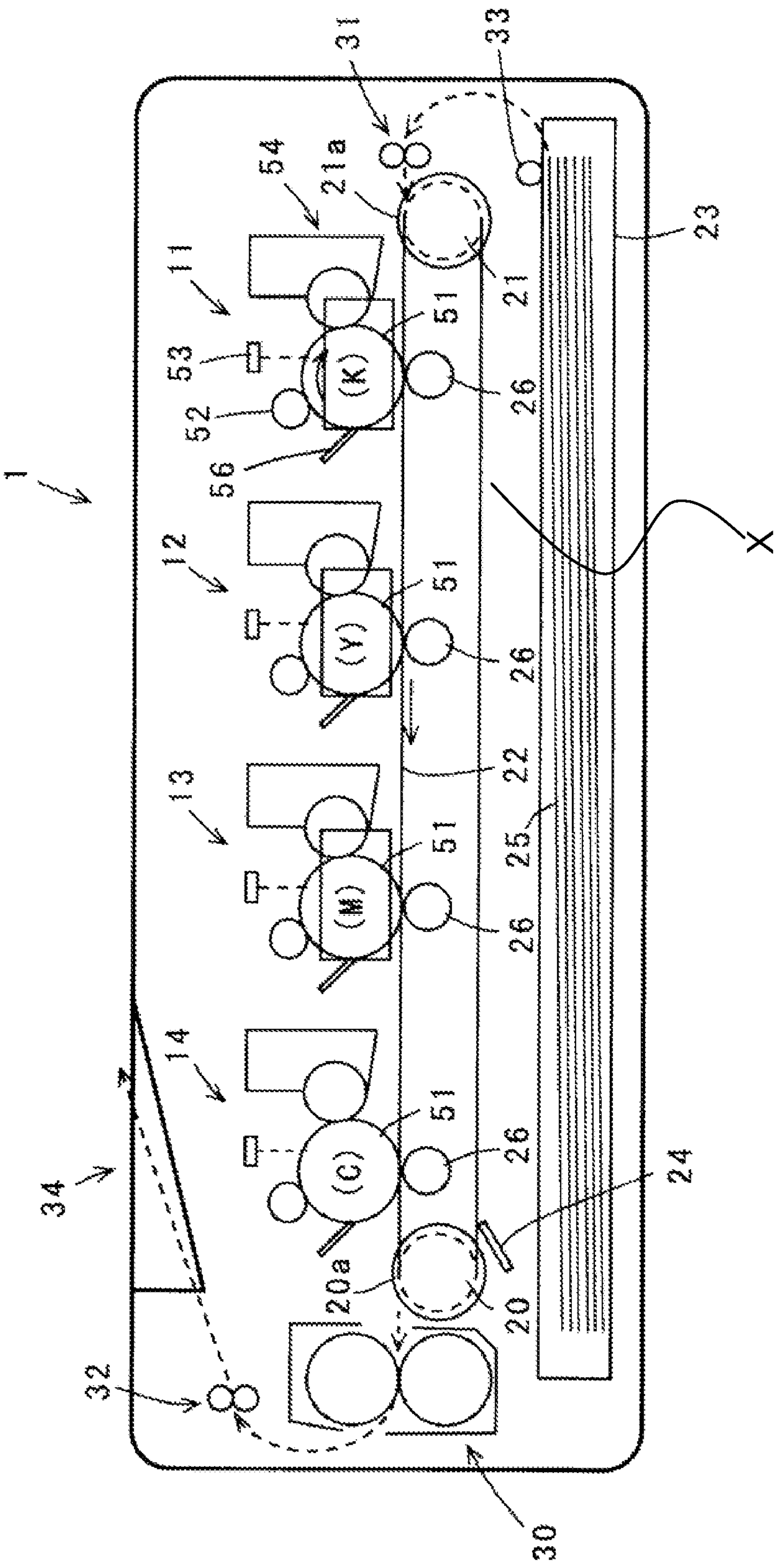
FIG. 1 is a schematic sectional view showing a configuration of an image forming apparatus with a belt unit according to a first embodiment of the present invention.

A first embodiment of the present invention will be explained. FIG. 1 is a schematic sectional view showing a configuration of an image forming apparatus 1 with a belt unit X according to the first embodiment of the present invention.

In the first embodiment, the image forming apparatus 1 has a configuration of a tandem type color electric-photography printer of a direct transfer type. A sheet supply cassette 23 is disposed in the image forming apparatus 1 for storing a recording sheet 25 as a recording medium. A sheet supply roller 33 is disposed in the image forming apparatus 1 for picking up the recording sheet 25 from the sheet supply cassette 23, and a transportation roller 31 is disposed in the image forming apparatus 1 for transporting the recording sheet 25 to toner image forming portions 11 to 14.

Further, in the image forming apparatus 1, along a transportation path of the recording sheet 25 from an upstream side in this order, the toner image forming portions 11 to 14 are provided as image forming portions for forming images of toner as developer in each of colors black (K), yellow (Y), magenta (M) and cyan (C), respectively. The toner image forming portions 11 to 14 have an identical configuration except using toner in a specific color.

In the embodiment, as shown in the image forming portion 11 using toner in black (K), each of the toner image forming portions 11 to 14 includes a photosensitive drum 51 as a static latent image supporting member; a charging unit 52 for supplying electric charges and charging a surface of the photosensitive drum 51; an exposure unit 53 for irradiating light on the surface of the photosensitive drum 51 to form a static latent image on the surface of the photosensitive drum 51; a developing unit 54 for developing the static latent image formed on the photosensitive drum 51 with toner to form the toner image; and a cleaning blade 56 arranged to contact with the photosensitive drum 51 for removing toner remaining on the surface of the photosensitive drum 51.

In the image forming apparatus 1, the belt unit X includes a belt 22 with an endless belt shape as a transportation member for transporting the recording sheet 25 as the recording medium; a drive roller 20 rotated with a drive unit (not shown) for driving the belt 22 in an arrow direction; a tension roller 21 paired with the drive roller 20 for extending the belt 22; and a cleaning blade 24 as a cleaning member for scraping off and cleaning toner attached to the belt 22.

Further, in the image forming apparatus 1, transfer rollers 26 are arranged as a transfer portion to face the photosensitive drums 51 with the belt 22 in between for transferring the toner images formed on the photosensitive drums 51 as visualized images of the static latent image with toner to the recording sheet 25.

In the embodiment, a fixing device 30 is provided for applying heat and pressure to the toner images formed on the recording sheet 25, so that the toner images are fixed to the recording sheet 25. Further, a transportation roller 32 is arranged for transporting the recording sheet 25 passing through the fixing device 30, and for discharging the recording sheet 25 to a discharge portion 34 after the toner images are fixed to the recording sheet 25.

In the embodiment, if necessary, it is preferred that a first wobble prevention member **20*a* and a second wobble prevention member 21*a* are disposed on one or both of the drive roller 20 and the tension roller 21 to engage a side surface portion of the belt 22 for preventing the belt 22 from wobbling. The first wobble prevention member 20*a* and the second wobble prevention member 21*a* may be arranged on one side of the belt 22 for preventing wobble, and may be arranged both sides of the belt 22**.

Figure 2:
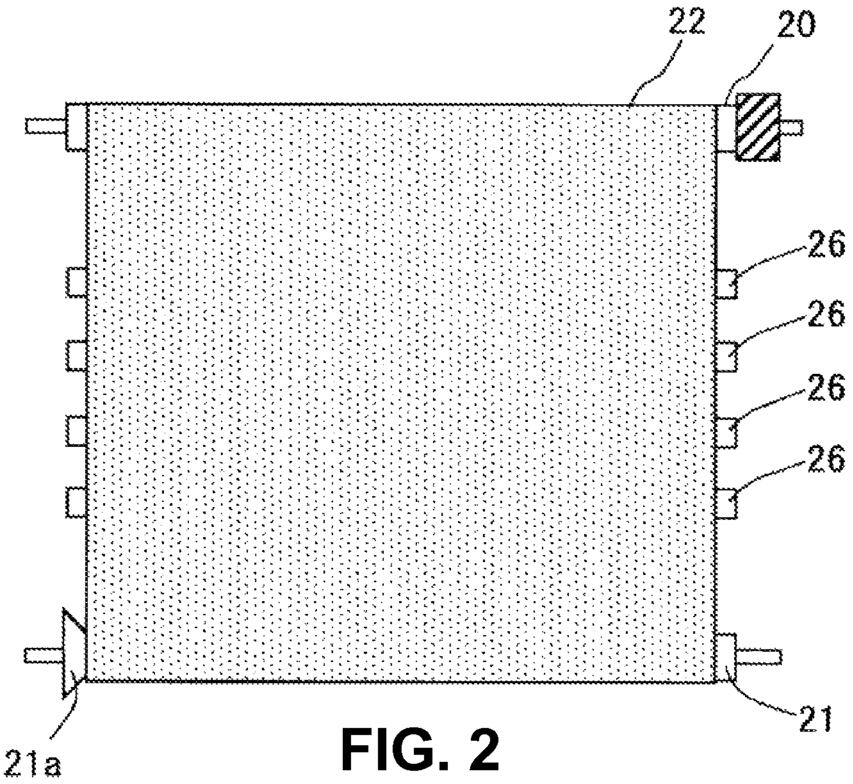
FIG. 2 is a schematic plan view showing the belt unit of the image forming apparatus having a wobble prevention guide member disposed only one of two side portions of a belt according to the first embodiment of the present invention.

FIG. 2 is a schematic plan view showing the belt unit X of the image forming apparatus 1 having the wobble prevention guide member **21*a* disposed only one of the two side portions of the belt 22 according to the first embodiment of the present invention. As shown in FIG. 2, the wobble prevention guide member 21*a* is formed of a flange shaped member having an inclined portion abutting against the side surface portion of the belt 22. Accordingly, the inclined portion guides the side surface portion of the belt 22 to regulate a lateral movement of the belt 22, thereby preventing the belt 22** from wobbling.

In the embodiment, the two rollers, i.e., the drive roller 20 and the tension roller 21, are disposed to extend the belt 22, so that the belt 22 is driven. Alternatively, three rollers may be disposed to extend the belt 22, so that the belt 22 is driven.

In the embodiment, as explained above, the belt unit X as a transportation unit includes the endless shape belt 22 as the transportation member; the drive roller 20 as a first extension member for extending the belt 22; the extension roller 21 as a second extension member for extending the belt 22; the first wobble prevention member 20*a* and the second wobble prevention member 21*a* disposed on the drive roller 20 and the tension roller 21 respectively for preventing the belt 22 from wobbling; and the clean blade 24 as the cleaning member arranged to contact with the belt 22 for removing foreign materials such as toner attached to the belt 22.

An operation of the image forming apparatus 1 will be explained next with reference to FIG. 1. It is noted that the recording sheet 25 is transported in an arrow direction represented with a hidden line.

First, a power source device (not shown) applies a voltage to the charging unit 52, so that the charging unit 52 charges the surface of the photosensitive drum 51 in each of the toner image forming portions 11 to 14. In the next step, when the photosensitive drum 51 rotates in an arrow direction, and the surface of the photosensitive drum 51 thus charged approaches a near the exposure unit 53, the exposure unit 53 exposes the surface of the photosensitive drum 51, so that the static latent image is formed on the surface of the photosensitive drum 51. Then, the developing unit 54 develops the static latent image, so that the toner image is formed on the surface of the photosensitive drum 51.

Further, the sheet supply roller 33 picks up the recording sheet 25 stored in the sheet supply cassette 23, and the transportation roller 31 and the belt 22 transports the recording sheet 25 toward one of the transfer rollers 26. When the photosensitive drum 51 rotates, the toner image formed on the surface of the photosensitive drum 51 reaches the one of the transfer rollers 26 and the belt 22. At this moment, a power source device (not shown) applies a voltage to the transfer rollers 26 and the belt 22. Accordingly, the toner image formed on the surface of the photosensitive drum 51 is transferred to the recording sheet 25. Subsequently, when the recording sheet 25 passes through the toner image forming portions 11 to 14, in which the toner images in colors of black (K), yellow (Y), magenta (M), and cyan (C) are formed, the toner images are sequentially transferred and overlapped to the recording sheet 25. Accordingly, a color image in colors is formed on the recording sheet 25.

In the next step, after the toner images in colors are formed and overlapped on the recording sheet 25, the belt 22 rotates to transport the recording sheet 25 to the fixing device 30. Accordingly, the fixing device 30 presses and heats the toner images on the recording sheet 25 to melt, so that the toner images are fixed to the recording sheet 25. Then, the transportation roller 32 discharges the recording sheet 25 to the discharge portion 34, thereby completing the printing operation. During the printing operation, after the recording sheet 25 is separated from the belt 22, the cleaning blade 24 cleans toner as the attached material or other foreign substances as other attached materials remaining on the belt 22.

The belt 22 with the endless shape will be explained in more detail next. In the embodiment, the belt 22 has a specific mirror index and a specific contact angle determined according to evaluation results in a continuous printing test (described later). It is noted that the belt is designated with the reference numeral 22 when the belt is specified as the belt of the image forming apparatus 1, otherwise the belt is designated with no reference numeral.

In the embodiment, a polyamide-imide resin (referred to as a PAI resin) is used as a base material of the belt. Carbon black is added to impart conductivity. A mixture is stirred in N-methylpyrrolidone solution, and is molded with a rotational molding method in a molded film with a film thickness of 100 μm and an inner diameter of 198 mm. Then, the molded film is cut to obtain the belt with a width of 230 mm. During the rotational molding, it is possible to obtain the endless belts with different mirror indexes through adjusting an extent of finishing process on an inner surface of a die metal.

In the embodiment, the mirror index is used as a parameter of a surface condition of the belt. The mirror index is measured with a shooting image pattern evaluation method using a mirror index measurement device. More specifically, a reflection image of an object and quality of imaging clarity are quantitatively evaluated, thereby making it possible to evaluate the surface condition. In the shooting image pattern evaluation method, it is possible to evaluate the surface condition over a wide area of 200 $mm^2$.

Different from a contact needle type surface roughness measurement device, the mirror index measurement device does not use a prove needle having a pointed tip for contacting with a surface of the belt. Accordingly, it is possible to evaluate without damaging the surface of the belt. Further, as opposed to a measurement area of a few mm of the contact needle type surface roughness measurement device, it is possible to evaluate a wide area with the mirror index measurement device. Accordingly, the shooting image pattern evaluation method is effective for evaluating the surface condition of the belt.

In the shooting image pattern evaluation method, the imaging clarity of the surface condition is digitized to obtain the mirror index. More specifically, clarity of a reference pattern (a reflection image) projected on a surface of a measurement object is calculated as a relative value between a reference specimen and the measurement object based on variance of a brightness value (brightness) distribution. As reference, an ideal surface of the reference specimen has the mirror index of 1,000. When the mirror index has a higher value, the measurement object has a better surface condition or a higher mirror index.

In the embodiment, the mirror index is measured with a mirror index meter SPO AHS-100 (a product of ARCHARIMA Co., Ltd.). A specific detail of the measurement has been described in reference such as Japanese Patent Publication No. 2007-225969, and a detailed explanation thereof is omitted.

As described above, the surface condition of the belt is dependent of the surface smoothness (brightness) of the die metal used in the rotational molding method. The surface of the die metal is polished to different degrees to obtain the belt with a desired mirror index. It is noted that, in order to maintain the high surface smoothness (brightness) of the die metal, it is necessary to perform frequent maintenance, thereby increasing a maintenance cost. Accordingly, it is preferred that the mirror index of the belt is less than 200.

In the embodiment, in addition to using the metal die described above, an additive agent having a fluoroalkyl group as a main chain is added to the PAI resin to properly improve oil repellant property according to an active state of the surface, thereby adjusting the oil repellant property of the surface of the belt. An additive agent with high compatibility to the base material of the belt is selected as the additive agent having the fluoroalkyl group as the main chain. When an amount of the additive agent is varied to change the oil repellant property of the surface of the belt, it is possible to obtain the belts having various contact angles (described later).

It is noted that a contact angle relative to n-dodecane does not increase greater than 45° even when the amount of the additive agent relative to a solid portion of the PAI resin exceeds 0.17 weight part. Accordingly, it is difficult to increase the contact angle relative to n-dodecane greater than 45°.

In the embodiment, the oil repellant additive agent is not limited to the additive agent having the fluoroalkyl group as the main chain, and may include a silicone type additive agent or other types of additive agents. Further, it is possible to utilize an inherent material property of the resin of the base material of the belt, thereby obtaining the belt having the oil repellant property.

In the embodiment, the base material of the belt is not limited the PAI resin. It is preferred that the base material of the belt has a minimum extensional deformation within a specific range when the belt is driven from the view point of durability and a mechanical property thereof. Further, it is preferred that the base material of the belt is not significantly susceptible to damages such as edge wear, edge folding, cracks, and the like due to repeated sliding against a wobble prevention member such as the first wobble prevention member 20*a*. More specifically, similar to the PAI resin in the embodiment, it is preferred that the base material of the belt is a resin such as polyimide (PI), polyetheretherketone (PEEK), and the likes, or a combination thereof having a Young's modulus equal to or greater than 2,000 MPa, more preferably, equal to or greater than 3,000 MPa.

In the embodiment, when the endless belt is manufactured with the rotational molding method, the solvent is adequately selected according to the base material of the endless belt. It is preferred that the solvent is a non-proton type polarity solvent, specifically including N,N-dimethyl acetamide, N,N-diethyl formamide, NMP (explained above), pyridine, tetramethyl sulfone, dimethyl tetramethyl sulfone, and the like. A single solvent can be used, or a mixture thereof may be used.

In the embodiment, carbon black may include, for example, furnace black, channel black, ketjen black, acetylene black, and so on. Carbon black can be used alone or as a mixture thereof. Carbon black is suitably selected based on targeted electric conductivity. In order to obtain a specific resistivity, channel black and furnace black are preferably used for the belt of the image forming apparatus 1 in the embodiment. Depending on an application, carbon black may be oxidized or treated to prevent oxidation degradation, or may be treated to improve dispersion in the solvent.

In the image forming apparatus 1 in the embodiment, it is preferred that the belt contains carbon black in the amount between 3 to 40 weight parts relative to the solid content of the resin, more preferably, 3 to 30 weight parts. Further, in order to impart desirable electric conductivity, the method is not limited to an electric conductivity method using carbon black. Alternatively, an ion conductive agent may be added to impart specific electric conductivity.

A method of evaluating the oil repellant property of the belt will be explained next. In the method of evaluating the oil repellant property of the belt, n-dodecane is used. N-dodecane has a low polarity and a backbone similar to that of a wax component of a paraffin type contained in toner. More specifically, a contact angle θ between n-dodecane and the belt surface is measured, thereby evaluating the oil repellant property of the belt surface.

Figure 3:
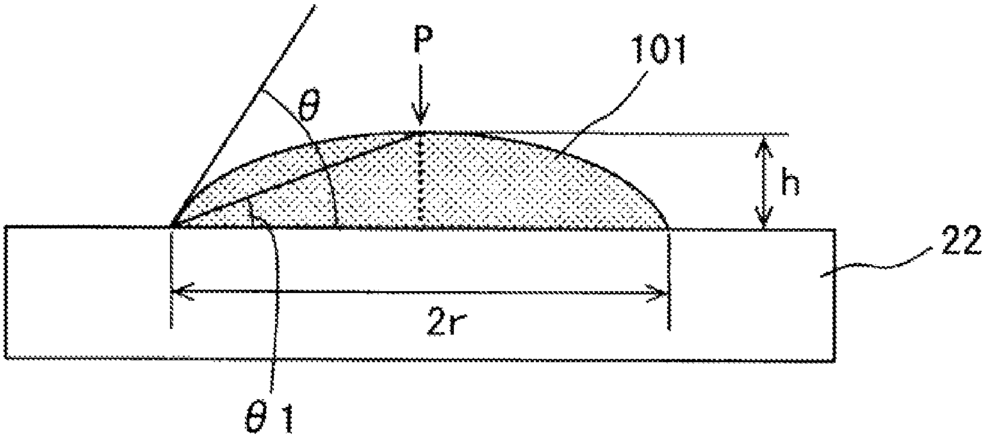
FIG. 3 is a schematic view showing a method of measuring a contact angle of the belt of the image forming apparatus according to the first embodiment of the present invention.

In the method of evaluating the oil repellant property of the belt, the contact angle θ in a hanging drop method is calculated with a 2/θ method. FIG. 3 is a schematic view showing the method of measuring the contact angle θ of the belt of the image forming apparatus 1 according to the first embodiment of the present invention.

As shown in FIG. 3, a liquid drop 101 of n-dodecane is formed on the belt 22 (a solid, a belt specimen), and is assumed to be a part of a minute sphere. In this case, an angle θ1 is defined by a solid surface and a straight line between an edge point of the liquid drop 101 and a top point P of the liquid drop. Accordingly, the contact angle θ (an angle between a liquid surface and a solid surface) is determined with a geometric algorithm as follows:

$$\theta = 2\times\theta 1$$

In the 2/θ method, the angle θ1 is calculated from a width 2r and a height h of the liquid drop. The contact angle θ is calculated as an average of values on a right side and a left side.

When the contact angle θ is determined, first, the belt specimen is fixed to a specimen stage such that a circumferential direction of the belt specimen is oriented to an observation direction by an angle of 90°. Then, n-dodecane is suck up for an appropriate amount with a syringe with a syringe needle having an inner wall coated with Teflon and an inner diameter of 0.8 mm (18 G Teflon coated needle, a product of Kyowa Interface Science Co., Ltd).

In the next step, the syringe is attached to a contact angle measurement device. The contact angle measurement device is placed under an environment of a temperature of 25° C. and humidity of 50%. 1.0 μl of n-dodecane is dropped on the belt specimen, and a shape of the liquid drop is observed immediately after n-dodecane is dropped on the belt specimen. At last, the contact angle θ is determined with the 2/θ method using a contact angle meter CA-X (a product of Kyowa Interface Science Co., Ltd).

An experiment for evaluating the image forming apparatus 1 will be explained next. In the experiment, a plurality of endless belts were prepared to have various mirror indexes M and the contact angles θ. Then, the endless belt was installed in the image forming apparatus 1, and a continuous printing operation was performed, so that an extent of flipping of the cleaning blade 24 and a continuous printing performance were evaluated according to printing results of the continuous printing operation. It is noted that, for the reason described above, the endless belt had the upper limit of the mirror index M at 200 and the upper limit of the contact angle θ at 45°.

In the experiment, toner contained a styrene-acrylic copolymer as a main component and 9 weight parts of paraffin wax produced through an emulsion polymerization. Toner had an average particle size of 7 μm and a sphericity of 0.95. Accordingly, in the continuous printing operation, it was possible to increase transfer efficiency, eliminate a releasing agent upon fixing, and perform development with good dot reproducibility and resolution, thereby obtaining an image with good sharpness and high quality.

In the experiment, the cleaning blade 24 as the cleaning member of the belt was formed of a urethane rubber having a thickness of 1.5 mm and rubber hardness JIS A of 83°. The cleaning blade 24 was installed such that a linear pressure became 4.3 g/mm. When the cleaning blade 24 is formed of an elastic material such as the urethane rubber, it is possible to effectively remove remaining toner and foreign matters with a simple and compact configuration, thereby reducing a cost.

Further, the urethane rubber exhibits high hardness, good elasticity, high wear resistance, high mechanical strength, high oil resistance, and high ozone resistance. It is noted that the cleaning blade is designated with the reference numeral 24 when the cleaning blade is specified as the cleaning blade of the image forming apparatus 1, otherwise the cleaning blade is designated with no reference numeral.

In the continuous printing operation in the experiment for evaluating the extent of flipping of the cleaning blade, A4 size PPC (Plain Paper Copy) sheets were used as the recoding sheet. The continuous printing operation was performed under three different environmental conditions, i.e., HH environment (a temperature 28° C., humidity 80%), NN environment (a temperature 23° C., humidity 50%), and LL environment (a temperature 10° C., humidity 20%). As a text pattern, lateral patterns of 1% in four colors, i.e., black (K), yellow (Y), magenta (M), and cyan (C), were printed on both sides of the sheet until a life of the belt was nearly elapsed. At an initial stage and during the continuous printing operation, the extent of flipping of the cleaning blade was evaluated according to whether the flipping of the cleaning blade (blade flipping) occurred.

In the continuous printing operation in the experiment for evaluating the continuous printing performance with respect to the cleaning performance (printing durability evaluation), the A4 size PPC sheets were used as the recoding sheet. The experiment was performed under the LL environment (the temperature 10° C., humidity 20%). Under the LL environment, the cleaning blade tends to have higher rigidity. Accordingly, as opposed to a higher temperature environment, the cleaning blade tends to not follow the belt easily. As a result, foreign matters (especially, toner) on the belt tend to pass through the cleaning blade.

Similar to the evaluation of the extent of flipping of the cleaning blade, as the text pattern, the lateral patterns of 1% in four colors, i.e., black (K), yellow (Y), magenta (M), and cyan (C), were printed on both sides of the sheet until the life of the belt was nearly elapsed. During the printing operation, it was determined whether a stain in a streak shape (referred to as pass-through) was visually observed. When the cleaning blade does not sufficiently clean the belt, toner remaining on the belt sticks to a backside surface of a subsequent printing sheet, thereby causing the streak stain.

Figure 4:
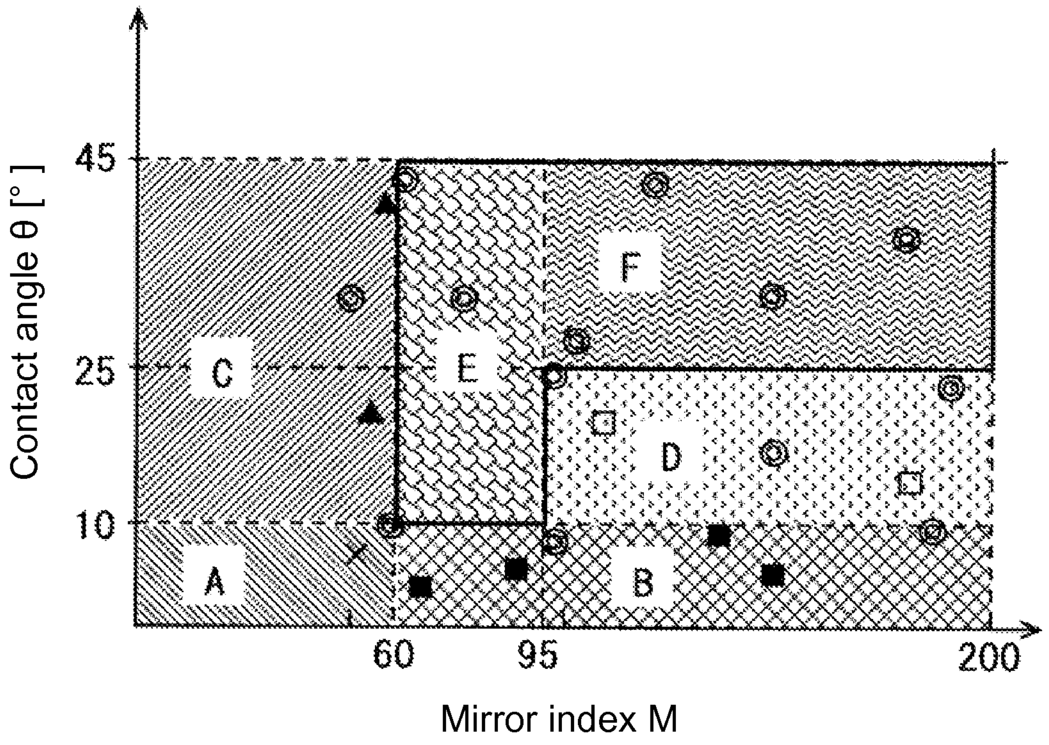
FIG. 4 is a graph showing results of a cleaning blade flipping evaluation and a performance evaluation of various belts disposed in the image forming apparatus according to the first embodiment of the present invention.

FIG. 4 is a graph showing results of the cleaning blade flipping evaluation and the cleaning performance evaluation in the experiment in which the various belts were disposed in the image forming apparatus 1 according to the first embodiment of the present invention. As shown in FIG. 4, the results of the cleaning blade flipping evaluation and the cleaning performance evaluation are represented with five symbols, "◎", "▲", "□", "■", and "X".

Moore specifically, when the blade flipping and the pass-through did not occur, the result was represented with "◎". When the blade flipping did not occur but the pass-through occurred, the result was represented with "▲". When the blade flipping did occur under the HH environment but did not occur under the NN environment and the LL environment, and the pass-through did not occur, the result was represented with "□". When the blade flipping did occur but the pass-through did not occur, the result was represented with "■". When the blade flipping and the pass-through did occur, the result was represented with "X".

In general, regardless of the mirror index of the belt surface, when the contact angle $\theta$ of n-dodecane is less than 5°, that is, the liquid does not form the liquid drop on the specimen, the blade flipping tends to easily occur. In the experiment, indeed, when the contact angle $\theta$ of n-dodecane was less than 5°, even if the belt had a relatively rough surface with the mirror index M less than 60, the blade flipping occurred.

On the other hand, when the contact angle $\theta$ of n-dodecane was greater than 10°, and the mirror index M of the belt surface was greater than 65 and smaller than 95, the blade flipping did not occur, and the belt moved smoothly. When the mirror index M of the belt surface was greater than 95, the blade flipping did occur under the HH environment (a region D in FIG. 4), and the blade flipping did not occur under the NN environment and the LL environment. Further, when the contact angle $\theta$ of n-dodecane was greater than 25°, even though the belt had a very smooth surface with the mirror index M of greater than 95, the blade flipping did not occur regardless of the environment, and the belt moved smoothly (regions E and F in FIG. 4).

Further, regardless of the contact angle $\theta$ of n-dodecane, when the mirror index M of the belt surface was smaller than 60, the pass-through (cleaning problem) did occur in the printing durability evaluation, thereby observing the streak stain on the backside surface of the medium after the printing operation (regions A and C in FIG. 4).

Next, there will an explanation for reasons why the cleaning blade flipping occurs and the cleaning blade flipping is effectively prevented when the contact angle $\theta$ of n-dodecane is less than 10°.

First, when the mirror index becomes higher, a contact area between the belt and the cleaning belt increases. Accordingly, a frictional force between the belt and the cleaning belt increases, so that the cleaning belt tends to flip.

Second, when the contact angle $\theta$ of n-dodecane is less than 5° (close to zero), that is, n-dodecane completely wets the belt, the cleaning blade formed of the urethane rubber, which has the contact angle $\theta$ of n-dodecane of 0°, tends to stick to the belt with a strong adherence force. Accordingly, the cleaning belt tends to strongly contact with the belt, and the frictional force between the belt and the cleaning belt increases, so that the cleaning belt tends to flip.

Third, when n-dodecane easily wets the belt, the belt tends to have a large variance in a frictional coefficient thereof. In this case, a stress against the cleaning belt tends to localize at a portion where a large difference in the frictional coefficient exists. Accordingly, the cleaning belt tends to be twisted in the printing durability evaluation, thereby causing the blade flipping.

It is noted that n-dodecane is an easily wet liquid having a critical surface tension $\gamma 1$ of 25 mN/m (23° C.) When the belt has the oil repellent property in terms of the contact angle $\theta$ of n-dodecane of greater than 10°, more preferably, greater than 25°, the belt tends to not stick to or easily separate from other organic substance. In other words, when the contact angle $\theta$ of n-dodecane increases, the belt tends to not stick to or easily separate from the cleaning belt.

Accordingly, in sum, when the contact angle $\theta$ of n-dodecane is between 10° and 25° ($10° \leq \theta < 25°$), and the mirror index M of the belt surface is less than 95, it is possible to prevent the blade flipping. Further, even through the mirror index M of the belt surface is greater than 95, the blade flipping does not occur under an environment other than the HH environment.

In is noted that the blade flipping did occur under the HH environment. This is because, when the belt has the very smooth surface with the mirror index M of the belt surface of greater than 95, in addition to the increase in the frictional force between the cleaning blade and the belt due to the increase in the contact area, the rigidity of the cleaning tends to decrease due to the high temperature under the HH environment, thereby deforming more easily. Further, due to the high humidity under the HH environment, toner and foreign matters on the belt tend to absorb moisture, thereby lowering flow ability thereof. Accordingly, then the cleaning blade scrapes off the foreign matters, a localized stress is generated, thereby overcoming the effect of the oil repellent property (10°≤θ<25°) and causing the blade flipping Further, it is noted that when the contact angle θ of n-dodecane was between 25° and 45° (25°≤θ≤45°), regardless of the mirror index M of the belt surface or the environment, it was confirmed that it was possible to effectively prevent the blade flipping relative to the belt having the mirror index M of the belt surface of greater than 95.

Next, there will an explanation for reasons why the pass-through tends to easily occur when the mirror index M is low.

When the mirror index M is low, it is difficult to press the cleaning blade against the belt with a uniform linear pressure, so that toner tends to easily pass through the cleaning blade. Further, when toner has a smaller particle size, it is possible to easily obtain an image with high quality for the reason explained above. At the same time, toner has a large relative surface area. Accordingly, toner tends to stick to the belt with a larger sticking force per area, thereby making it difficult to clean the belt with the cleaning blade.

Further, when toner has a smaller particle size, toner tends to not flow easily. In order to compensate the poor flow property of toner, it is necessary to add an additive agent for a large amount. In this case, when the mirror index M is low, toner and substances derived from toner tend to remain on the belt and easily pass through the cleaning blade.

Accordingly, from the results of the evaluation described above, when the contact angle θ of n-dodecane is smaller than 10° (θ≤10°), more preferably between 25° and 45° (25°≤θ≤45°), the frictional force generated between the belt and the cleaning blade formed of the urethane rubber becomes smaller than the force necessary for generating the blade flipping, even when the belt surface has a large mirror index, and the contact area between the belt and the cleaning blade is large.

Further, when the mirror index M of the belt surface is greater than 60, it is possible to securely obtain the sufficient contact area between the belt and the cleaning blade necessary for cleaning the belt. Accordingly, when the mirror index M of the belt surface is greater than 60, regardless of the contact angle θ of n-dodecane, it is possible to efficiently remove toner and substance derived from toner remaining on the belt.

Further, when the contact angle θ of n-dodecane is smaller than 10° (θ≤10°), it is possible to impart good release property relative to toner containing wax of a paraffin type as the oil component similar to n-dodecane. As a result, it is possible to efficiently remove toner and substance derived from toner remaining on the belt. It is noted that, when the mirror index M of the belt surface is less than 60, it is difficult to obtain sufficient durability of the belt, in addition to the blade flipping and the pass-through. Accordingly, the lower limit of the mirror index M of the belt surface is set at 60.

As explained above, as shown in FIG. 4, when the contact angle θ of n-dodecane increases, or the mirror index M of the belt surface decreases, the cleaning blade tends to easily flip. Further, when the mirror index M of the belt surface increases, toner tends to easily pass through the cleaning blade.

Accordingly, from the results of the evaluation shown in FIG. 4, when the contact angle θ of n-dodecane is between 25° and 45° (25°≤θ≤45°), and the mirror index M of the belt surface is between 60 and 200 (60≤M≤200), the blade flipping and the pass-through do not occur under the normal temperature and normal humidity environment and the low temperature and low humidity environment. Accordingly, depending on a usage environment of the image forming apparatus 1, the ranges of the contact angle θ of n-dodecane and the mirror index M of the belt surface may be set between 25° and 45° (25°≤θ≤45°), and between 60 and 200 (60≤M≤200), respectively.

Further, when it is necessary to prevent the blade flipping and the pass-through under any usage environments of the image forming apparatus 1, the contact angle θ of n-dodecane is set between 10° and 45° (10°≤θ≤45°) when the mirror index M of the belt surface is between 60 and 95 (60≤M≤95). Further, the contact angle θ of n-dodecane is set between 25° and 45° (25°≤θ≤45°) when the mirror index M of the belt surface is between 95 and 200 (95≤M≤200).

As described above, in the image forming apparatus 1, when the belt has the contact angle θ of n-dodecane is smaller than 10° (θ≤10°), and the mirror index M of the belt surface is between 60 and 95 (60≤M≤95), it is possible to reduce the sticking force between the belt and the cleaning blade, and to alleviate the frictional force between the belt and the cleaning blade, thereby making it possible to reduce the blade flipping. Further, when the belt has the contact angle θ of n-dodecane between 25° and 45° (25°≤θ≤45°), it is possible to reduce the blade flipping regardless of the usage environments even when the belt has the very smooth surface with the mirror index M of the belt surface greater than 95 (95≤M). Accordingly, it is possible to prevent the cleaning problem due to the blade flipping.

Further, under the normal temperature and normal humidity environment and the low temperature and low humidity environment, when the belt has the contact angle θ of n-dodecane greater than 10° (10≤θ), it is possible to prevent the belt from causing a problem. Further, when the belt has the mirror index M of the belt surface greater than 60 (60≤M), it is possible to securely obtain the sufficient contact area between the belt and the cleaning blade necessary for cleaning the belt. Accordingly, it is possible to efficiently remove toner and substance derived from toner remaining on the belt.

Further, when the mirror index M of the belt surface is between 60 and 95 (60≤M≤95), the contact angle θ of n-dodecane is set between 10° and 45° (10°≤θ≤45°). Further, the contact angle θ of n-dodecane is set between 25° and 45° (25°≤θ≤45°) when the mirror index M of the belt surface is between 95 and 200 (95≤M≤200). Accordingly, it is possible to prevent the blade flipping and the pass-through under any usage environments of the image forming apparatus 1.

In the first embodiment, the transfer roller 26 transfers the toner image formed on the photosensitive drum 51 directly to the recording sheet 25 transported with the belt 22 through a direct transfer method. Alternatively, the invention may be applied to an intermediate transfer method. In the intermediate transfer method, the toner image formed on the photosensitive drum 51 is transferred first to the belt 22 as the transportation member. After the toner image is transported, the toner image transferred to the belt 22 is transferred to the transfer roller 26.

In view of the problems described above, an object of the present invention is to provide an image forming apparatus capable of solving the problems of the conventional image forming apparatus.

Further objects and advantages of the invention will be apparent from the following description of the invention.

In the aspect of the present invention, it is possible to provide the transportation unit with good cleaning performance.

Second Embodiment

A second embodiment of the present invention will be explained next. A belt in the second embodiment is installed in the image forming apparatus 1 in the first embodiment. Other than the belt, the image forming apparatus 1 has a configuration similar to that of the image forming apparatus 1 in the first embodiment. Accordingly, if necessary, the image forming apparatus 1 will be referred to in the following description.

An experiment for evaluating the image forming apparatus 1 will be explained. In the experiment, a plurality of endless belts is prepared with the method of preparing the belt in the first embodiment described above. In the experiment, the additive agent was added in an amount from 0.05 weight % to 0.40 weight % relative to the solid portion of the PAI resin, so that the endless belts had the mirror index M of 100 and the contact angle θ of n-dodecane of greater than 10°.

Figure 6:
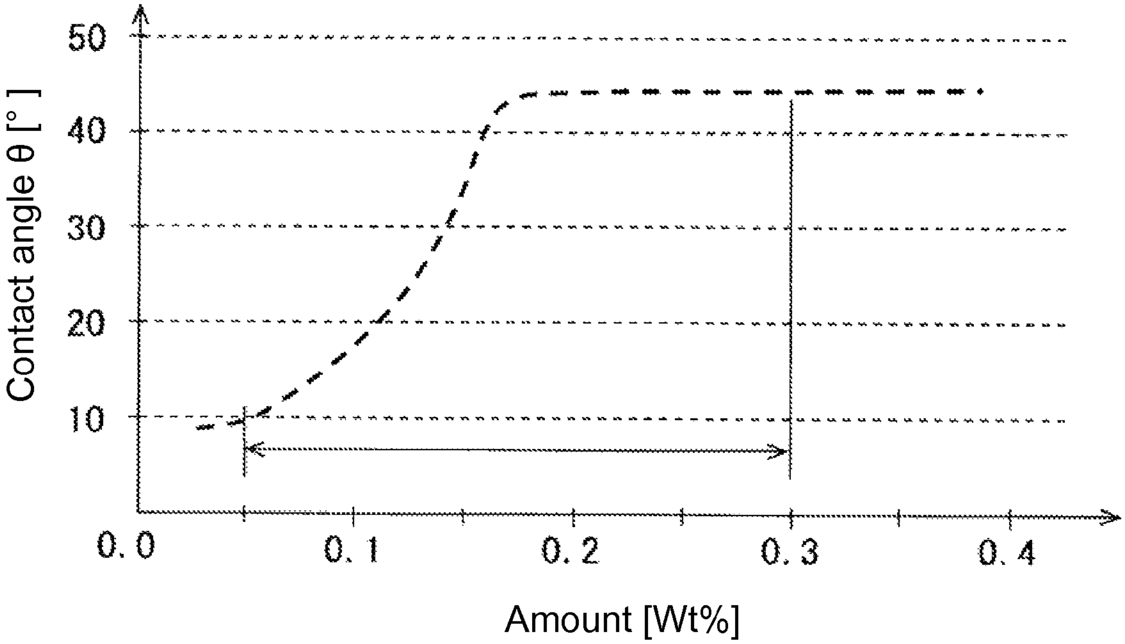
FIG. 6 is a graph showing a relationship between an amount of an additive agent and a contact angle θ relative to n-dodecane in the image forming apparatus according to the second embodiment of the present invention.

FIG. 6 is a graph showing a relationship between the amount of the additive agent and the contact angle θ relative to n-dodecane in the image forming apparatus 1 according to the second embodiment of the present invention. As shown in FIG. 6, even when the amount of the additive agent increased more than 0.17 weight %, the contact angle θ of n-dodecane did not change significantly. It was confirmed that the contact angle θ of n-dodecane was stable between 25° and 45° (25°≤θ≤45°).

It is noted that it is necessary to add the oil repellent component as the additive agent for more than 0.05 weight % in order to obtain the contact angle θ of n-dodecane of greater than 10°. That is, when the additive agent is not added, even though the photosensitive drum 51 is not stained, it is not possible to obtain the contact angle θ of n-dodecane of greater than 10°. Further, it is necessary to add the oil repellent component as the additive agent for more than 0.13 weight % in order to obtain the contact angle θ of n-dodecane of greater than 25°.

Figure 5:
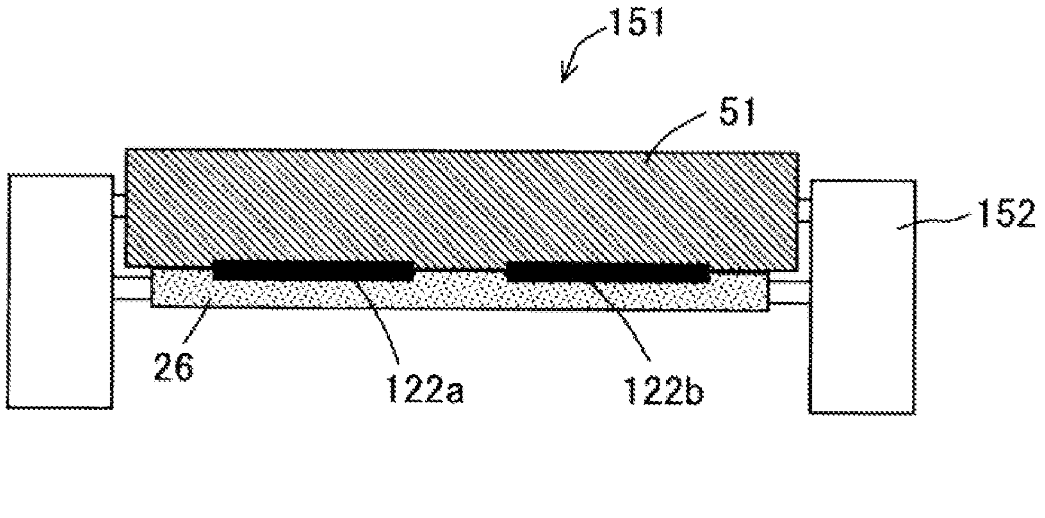
FIG. 5 is a schematic view showing a method of evaluating a stain influence of the belt on a photosensitive drum of the image forming apparatus according to a second embodiment of the present invention.

A storage test was conducted for evaluating the stain influence of the belt on the photosensitive drum 51. FIG. 5 is a schematic view showing a method of evaluating a stain influence of the belt on the photosensitive drum 51 of the image forming apparatus 1 according to the second embodiment of the present invention. As shown in FIG. 5, in a storage test jig 151, the photosensitive drum 51 and the transfer roller 26 of the image forming apparatus 1 are detachably attached to a holding portion 152.

In the storage test, belts 122*a* and 122*b* were prepared to contain different amounts of the oil repellent imparting agents (the oil repellent components). Then, the belts 122*a* and 122*b* were cut in a size of 80 mm×80 mm, and were sandwiched with a constant tension between the photosensitive drum 51 and the transfer roller 26 attached to the holding portion 152.

In the next step, the storage test jig 151 was placed in a dark room for 96 hours under an environment of a temperature of 70° C. and humidity of 90%. During the storage test, it was confirmed that condensation did not occur on the belts 122*a* and 122*b*, the photosensitive drum 51, and the transfer roller 26. As a comparison example, a belt 112*b* without the oil repellent imparting agent was also evaluated.

After the storage test was completed, the storage test jig 151 was placed in the dark room for 24 hours under an environment of a temperature of 25° C. and humidity of 50%, so that the storage test jig 151 was acclimated with the environment. Afterward, the belts 122*a* and 122*b*, the photosensitive drum 51, and the transfer roller 26 were removed from the storage test jig 151, and the photosensitive drum 51 was installed in, for example, the image forming portion 14 for forming an image in cyan of the image forming apparatus 1 shown in FIG. 1.

In the next step, after the photosensitive drum 51 was installed in the image forming portion 14, the image forming apparatus 1 performed a printing operation for printing a 100% solid image and a half-tone image on ten sheets continuously, so that the solid image and the half-tone image were evaluated. A plurality of the belts 122*a* and 122*b* with the different amounts of the oil repellent imparting agents (including the one without the oil repellent imparting agent as the comparison example) was evaluated, thereby evaluating the stain influence of the belts with the different additive amounts on the photosensitive drum 51.

In the evaluation, the stain influence of the belts on the photosensitive drum 51 was evaluated as "○" or "X" according to an extent of a white out or a black streak generated in the solid image and the half-tone formed in the printing operation at a contact point between the photosensitive drum 51 and the belts 122*a* and 122*b* during the storage test.

Table shows the results of the evaluation of the stain influence of the belts on the photosensitive drum 51. In Table, when the white out or the black streak was not formed, that is, the belts 122*a* and 122*b* did not stain the photosensitive drum 51, the result is represented with "○". When the white out or the black streak was formed, but disappeared on the second sheet and after, the result is represented with "X".

TABLE

| Additive amount (Wt %) | Stain Result |
|---|---|
| 0.00 | ○ |
| 0.05 | ○ |
| 0.10 | ○ |
| 0.15 | ○ |
| 0.20 | ○ |
| 0.25 | ○ |
| 0.30 | ○ |
| 0.40 | x |

As shown in Table, when the belts 122*a* and 122*b* contained the additive agent less than 0.30 weight % and contacted with the photosensitive drum 51, the stain was not formed in the images. Accordingly, it is confirmed that the belt does not have an influence on the photosensitive drum 51 even under the harsh environmental condition. On the other hand, when the belts 122*a* and 122*b* contained the additive agent greater than 0.40 weight % and contacted with the photosensitive drum 51, the white out and the black stream were formed in the images, although an extent thereof was minimal. The results indicate that the additive agent contained in the belts in an excess amount bled out from inside the belts and moved to the surface of the photosensitive drum after the belts were placed under the high temperature and high humidity environment for an extended period of time.

When the oil repellent component was attached to the surface of the photosensitive drum 51, a difference in a charge amount was created with respect to a portion where the oil repellent component is not attached, thereby causing a problem in an image. This phenomenon may occur between the belt and the cleaning blade 24 contacting with the belt under a constant pressure. Accordingly, the oil repellent component attached to the contact portion of the cleaning blade 24 promotes agglomeration and accumulation of toner scraped off during the printing durability evaluation, thereby causing the cleaning problem.

Accordingly, when the belt 22 of the image forming apparatus 1 contains the oil repellent imparting agent (the oil repellent component) in the amount between 0.05 weight % and 0.30 weight %, it is possible to obtain the contact angle θ of n-dodecane of less than 10°. As a result, it is possible to form an image with good quality for an extended period of time without staining the photosensitive drum 51. Further, when the belt 22 contains the oil repellent component in the amount between 0.13 weight % and 0.30 weight %, it is possible to obtain the contact angle θ of n-dodecane between 25° and 45° without staining the photosensitive drum 51.

Further, when the belt 22 contains the oil repellent component in the amount greater than 0.17 weight %, the contact angle θ of n-dodecane does not change significantly. Accordingly, when the belt 22 contains the oil repellent component in a specific amount smaller than 0.17 weight %, it is possible to stably obtain the contact angle θ of n-dodecane between 25° and 45° (25°≤θ≤45°) without causing a problem such as the stain on the photosensitive drum 51. In other words, when the belt 22 contains the oil repellent component in the amount between 0.13 weight % and 0.17 weight %, it is possible to obtain the contact angle θ of n-dodecane between 25° and 45° without staining the photosensitive drum 51 and adding an excess amount of the oil repellent component.

In the embodiments described above, the present invention is applied to the electro-photography printer. The present invention is not limited thereto, and may be applicable to an MFP (Multi Function Printer), a facsimile, a copier, and the like using an endless belt.

The disclosure of Japanese Patent Application No. 2010-061290, filed on Mar. 17, 2010, is incorporated in the application.

While the invention has been explained with reference to the specific embodiments of the invention, the explanation is illustrative and the invention is limited only by the appended claims.

What is claimed is:

1. A belt to be disposed in an image forming apparatus having a cleaning member arranged to abut against the belt for removing foreign matters attached to the belt, comprising:

a surface having a contact angle θ relative to n-dodecane between 10° and 45° (10°≤θ≤45°) and a mirror index M between 60 and 95 (60≤M≤95).

2. The belt according to claim 1, wherein said belt is formed of a polyamide-imide.

3. The belt according to claim 1, wherein said belt contains an oil repellent component in an amount between 0.05 weight % and 0.30 weight % relative to a solid component of the belt.

4. The belt according to claim 3, wherein said belt contains the oil repellent component having a fluoroalkyl group as a main chain.

5. The belt according to claim 1, wherein said belt is formed of an endless belt.

6. The image forming apparatus comprising the belt according to claim 1 and the cleaning member arranged to abut against the belt for removing the foreign matters attached to the belt.

7. The image forming apparatus according to claim 6, wherein said cleaning member includes an elastic member.

8. The image forming apparatus according to claim 7, wherein said elastic member includes a urethane rubber.

9. The image forming apparatus according to claim 6, wherein said foreign matters are toner.

* * * * *